United States Patent [19]

Cox, Jr. et al.

[11] Patent Number: 5,655,006

[45] Date of Patent: Aug. 5, 1997

[54] AUTOMATED SYSTEM AND METHOD FOR VOICE PROCESSING

[75] Inventors: Louis Anthony Cox, Jr., Denver; Edward J. Fontenot, Niwot; Kenneth L. Hamel, Boulder; Hans-Peter Mueller, Longmont; Victoria L. Corlew, Boulder, all of Colo.

[73] Assignee: U S West, Inc., Englewood, Colo.

[21] Appl. No.: 572,302

[22] Filed: Dec. 14, 1995

[51] Int. Cl.$^6$ .................................................. H04M 3/50
[52] U.S. Cl. .................................................. 379/89; 379/71
[58] Field of Search .................................. 379/67, 71, 74, 379/76, 77, 84, 88, 89

[56] References Cited

U.S. PATENT DOCUMENTS

| | | | |
|---|---|---|---|
| 4,580,012 | 4/1986 | Matthews et al. | 379/89 |
| 4,625,081 | 11/1986 | Lotito et al. | 379/88 |

Primary Examiner—Thomas W. Brown
Attorney, Agent, or Firm—Brooks & Kushman, P.C.

[57] ABSTRACT

An automated method and system for voice processing is used with a plurality of voice mail boxes each of which is assigned to a corresponding one of a plurality of subscribers and is operative to receive and store a plurality of voice messages. After playback of the stored message has begun, playback may be suspended and a response may be generated by a subscriber (the called party) to the previous message segment. The response is directed to a selected destination and may include attachment of the message segment. Playback may thereafter be resumed and suspended in the same manner so as to form multiple responses to the stored message. Multiple responses to the same destination are concatenated so as to form a single concatenated response.

10 Claims, 3 Drawing Sheets

AUTOMATED SYSTEM AND METHOD FOR VOICE PROCESSING

TECHNICAL FIELD

This invention relates to an automated system and method for voice processing wherein a user may suspend playback of a stored message, generate a subresponse and resume playback of the message. The subresponses are concatenated so as to form a single concatenated response.

BACKGROUND ART

Telephone subscribers have long desired to have a means to receive all calls made to them. As a result, answering services and the like have existed for a number of years. Historically, these answering services have focused on business as opposed to residential telephone users. While suited for their intended purpose, such answering services were also limited in that a caller could only leave a brief message to be written down by the answering service and later relayed to its intended recipient. The personal touch of hearing a "familiar" voice was therefore lost. Similarly, inflection or intonation indicating emotions such as anger, love, etc. could not be communicated. In addition, the accuracy of the message was directly related to the conscientiousness of the answering service. Finally, because the message had to be left with another person, there was no privacy.

Subsequent to answering services, portable answering machines were introduced. These machines allow incoming callers to record a message which may be left for a telephone subscriber. Although such systems address the privacy limitations of the prior art, they are nonetheless subject to equipment breakdown and they are expensive in that a single machine is generally required for each telephone number. In a business setting, these associated costs are often prohibitively expensive. Finally, in either a business or residential setting, aesthetics require that the answering machine be hidden or at least partially concealed. Problems with equipment failure and subsequent repair as well as cost have limited the usefulness of these machines. In addition, answering machines are not activated when the line is busy, i.e., off-hook. Thus, a caller can only leave a message when the line is idle. As a result, such machines lack utility for those persons who need their calls answered the most, i.e. persons who frequently use the telephone and do not wish to miss calls when their phone is in use.

In recent years, Voice Mail (VM) systems, also known as voice messaging systems, have become available. These systems handle calls that do not reach the intended extension user by recording the caller's message. Voice mail systems operate with most Private Branch Exchanges (PBXs), hybrid, or key telephone systems and allow users to send, receive, and redirect voice messages through office telephone systems and computers.

Voice messaging systems have the same advantages of an answering machine, but do not require a separate piece of equipment. Generally, the equipment to provide the messaging system is owned by the provider of the service. Both the subscriber to the system and all callers making calls to that subscriber may leave messages on the system. The subscriber may access the system from remote locations, which, in the case of answering machines, is not always possible. In addition, voice messaging systems allow the caller to leave a message when the called line is busy so as to allow the user to selectively save or erase messages. Voice messaging systems therefore allow a user to enjoy the advantages of an answering machine without the above-stated limitations and associated disadvantages acquiring, repairing, and otherwise maintaining an answering machine. In addition, more options and features are available on voice messaging systems. As readily seen, voice messaging systems have thus become exceedingly popular. Most businesses are now equipped with some type of voice mail service and long voice mail messages are routinely generated and received by subscribers.

One limitation of current voice messaging systems, however, is that they do not allow for a message recipient to listen to only a portion of a received message and respond. That is, if a long message is left for the subscriber with a number of points being made by a caller, it is sometimes difficult for the listener to remember each point and formulate a response once playback of the message is complete. While many voice messaging systems incorporate features for a user to replay, rewind, or fast-forward through a message, such actions are often cumbersome to the called party, especially when listening to a voice message on a cellular telephone while driving or in similar situations where note taking or complicated manipulation of the voice message is inconvenient.

Consequently, a need has developed for an automated method and system for voice processing wherein a subscriber may suspend playback of a stored message, generate a response and thereafter resume playback of the message. Such a method and system should permit the subscriber's responses, i.e., subresponses to be concatenated so as to generate and forward a single concatenated response.

DISCLOSURE OF THE INVENTION

It is a principal object of the present invention to provide an automated voice processing system and method which permits a called party to suspend playback of a stored message, generate a response and then resume playback of the message.

It is a further object of the present invention to provide such an automated system and method wherein a called party may suspend playback of a stored message multiple times, each time being provided the opportunity to generate a response and thereafter resume playback of the message until the message is complete or playback is suspended again.

Still further, it is an object of the present invention to provide such an automated system and method wherein the responses generated by the called party are concatenated so as to form a single concatenated response for receipt by the calling party or a new destination.

Yet still further, it is an object of the present invention to provide an automated system and method of the type referenced above wherein each of the responses generated by the called party may be attached to corresponding portions or segments of the stored messages sent by the calling party.

In carrying out the above-stated objects, there is provided an automated method for voice processing which is adapted for use in a telephone network. The method includes the provision of a plurality of voice mail boxes, each of which is assigned to a corresponding one of a plurality of subscribers in the telephone network. Each of the voice mail boxes is operative to receive and store a plurality of voice messages sent by a corresponding one of the plurality of subscribers. The method includes activating a playback of a stored message and suspension of playback after playing a first portion thereof. After a response has received to the first portion of the message, playback is resumed and the response is forwarded to the appropriate subscriber. The steps of suspending, receiving, resuming and forwarding are performed via components of the telephone network.

The automated method contemplates that the stored message may be suspended numerous times, each time providing the subscriber the opportunity to (1) generate a response; (2) attach the response to the current segment of the message; (3) send the response or response/message segment to the calling party; (4) send the response or response/message segment to a new destination; or (5) resume playback of the stored message. In situations where more than one response (including attached message segments) are sent to the same destination, the individual responses (subresponses) are concatenated so as to form a single concatenated response.

An automated system is further provided to carry out the above-described method. The automated system similarly includes a plurality of voice mail boxes, each of which is assigned to a corresponding one of a plurality of subscribers and which is operative to receive and store a plurality of voice messages sent by a corresponding one of the plurality of subscribers. The system further includes a processor in electrical communication with the plurality of voice mail boxes. The processor is operative to: (a) playback a stored message, (b) suspend playback of the stored message after playing a first portion or segment thereof, (c) receive a response to the first portion of the message, (d) resume playback of the message after receiving the response, and (e) forward the response to the one of the plurality of subscribers that sent the message or a new destination.

As in the above-described method, the processor is operative to suspend playback of the storage message multiple times, each time receiving a corresponding response to be sent to the calling party or a new destination, and thereafter resuming playback of the message. Where multiple responses (subresponses) are sent to the same destination, the subresponses are concatenated so as to form a single concatenated response. As described above, the processor may further be operative to attach each subresponses to the corresponding portions or segments of the original message which it was generated in response to.

These and other objects, objects, features, and advantages of the present invention are readily apparent from the following detailed description of the best mode for carrying out the invention when taken in connection with the accompanying drawings wherein like reference numerals correspond to like components.

BEST MODES FOR CARRYING OUT THE INVENTION

System Hardware

Figure 1:
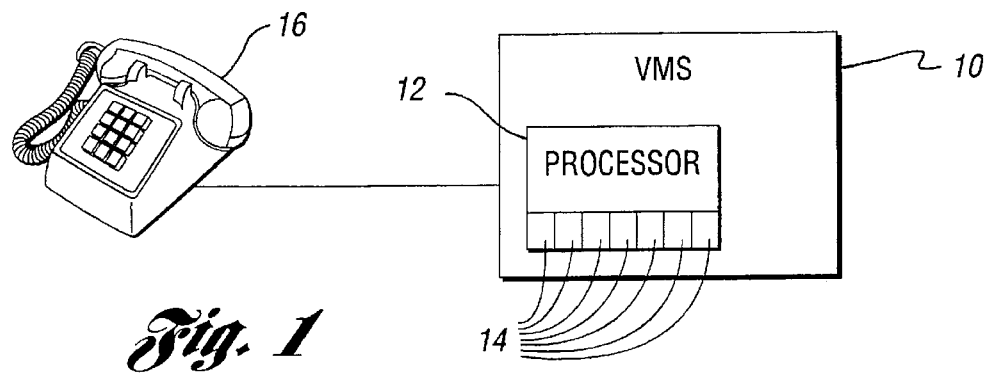
FIG. 1 is a schematic diagram of one embodiment of a voice processing system of the present invention.

FIG. 1 illustrates a first embodiment of the automated voice processing system of the present invention. As shown, system 10 includes a central processor 12 having a plurality of voice mail boxes graphically depicted by reference numeral 14. Processor 12 includes specialized software to control system operations as well as analog-to-digital converters (not shown) to convert voice-to-data and back again. As those skilled in the art will recognize, conversion rates vary among systems with the conversion rate directly proportional to disk space usage. Thus, while higher sampling rates invariably result in better speech quality, they also require greater disk space. System designers thus aim for the lowest rates that produce the best voice quality.

Figure 2:
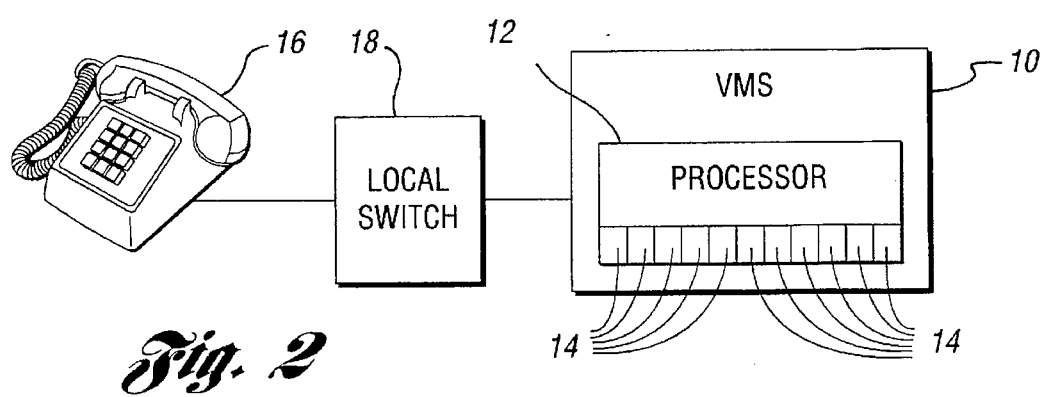
FIG. 2 is a schematic diagram of an alternative embodiment of the voice processing system of the present invention adapted for use in a Public Switched Telephone Network.

Each voice mail box is in an electronic location within the system where specific subscriber's messages are stored. Each voice mail box is assigned a unique number, which functions as its address within the system. Access to voice mail boxes is password-protected. The subscriber 16 must enter the correct password to open the mail box for the purpose of retrieving messages and performing other system functions. Each voice mail box is assigned to a corresponding one of a plurality of subscribers and is operative to receive and store a plurality of voice messages sent by a corresponding one of the plurality of subscribers. System 10 may be integrated within a PBX, added on as a peripheral system, or may be a part of the Public Switched Telephone Network (PSTN) as shown in FIG. 2 wherein the local switch is designated by reference numeral 10.

System 10 requires considerable amount of high-capacity disk storage for system programs, digitized voice prompts, configuration tables, subscriber personal greetings, voice messages, and system administration data. The amount of storage required depends on the number of messages to be stored, average message length, analog-to-digital conversion rate, and message retention time. System 10 further requires input/output ports (not shown) to connect to the PBX or telephone network, and maintenance in administration devices. A variety of connections are possible, including a PBX extension line, a central office line, E&M tie line, Direct Inward Dial (DID) line, and proprietary PBX integration applications.

System Operation

Figure 3:
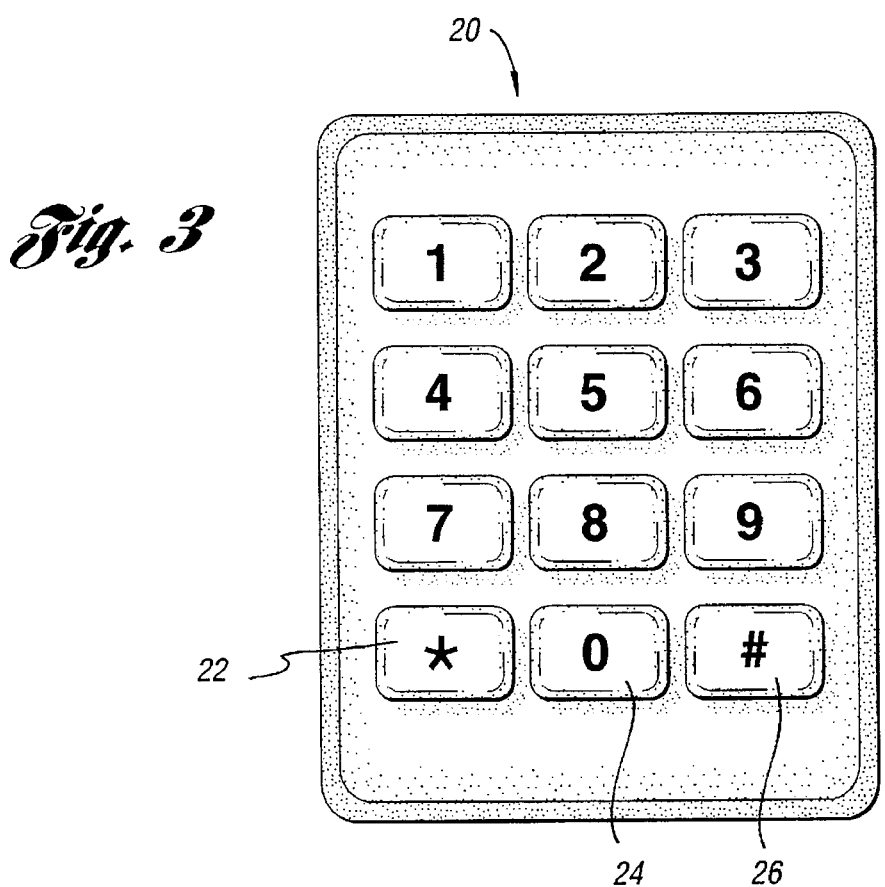
FIG. 3 is a schematic diagram of an interface suitable for use with the voice processing system of the invention shown in FIGS. 1–2.

In operation, a caller, i.e. a calling party, sends a voice message into the system, where it is digitized, stored on a high-speed disk subsystem (not shown) for further processing, and made available for editing, if necessary. The subscriber 16, i.e. the called party, accesses and listens to voice messages using an appropriate interface such as, for example, a Dual Tone Multi Frequency (DTMF) keypad such as that shown in FIG. 3. If the system if PBX-integrated, the system may provide message notification by activating message-waiting lights on a subscriber's telephone or by altering the dial tone sound (stutter dial tone) when the station goes off-hook.

Keypad 20 includes four rows of keys. The top three rows are numbered 1–9 and the lower row contains three keys, "*", "0", and "#" identified by reference numerals 22, 24 and 26, respectively. DTMF keypad 20 is a standard in the telephone industry and is one example of an appropriate interface to be used to interact with the voice messaging system described above and to perform the voice processing steps as discussed below. References depressing "1", "5" and "#", etc. will thus refer to depression of the corresponding key of the DTMF keypad.

A subscriber 16 dials into the voice mail system and accesses the mail box by entering a password. Password protection, as described above, ensures privacy and security so as to prevent toll fraud. To retrieve a message, the subscriber first hears an announcement telling the number of new messages in the mail box. Messages may be played on a first-in, first-out basis, or on a last-in, first-out basis, depending upon system set-up.

After listening to a first portion or "segment" of a message, a user may suspend playback of the stored message by depressing a designated DTMF key such as key "8". As shown at block 28 of FIG. 4, a standardized instruction may thereafter be provided such as follows: "Begin recording at the tone. When you are finished, press #." In this example, an audible tone or similar means is provided to prompt the called party to begin recording her response. The subscriber is requested to depress the DTMF key "#" (block 30) to indicate that recording is complete.

Alternatively, the system may be voice-actuated such that the called party may initiate recording of her response simply be speaking and terminate recording by not speaking. In this design, an audible tone would not be necessary to prompt the subscriber to begin recording. Similarly, the subscriber would not need to depress a DTMF key to let the system know that recording has been completed. In this alternative embodiment, it is contemplated that the system would be set-up to terminate recording after a selected time period has elapsed from the called party's last spoken word.

Figure 4:
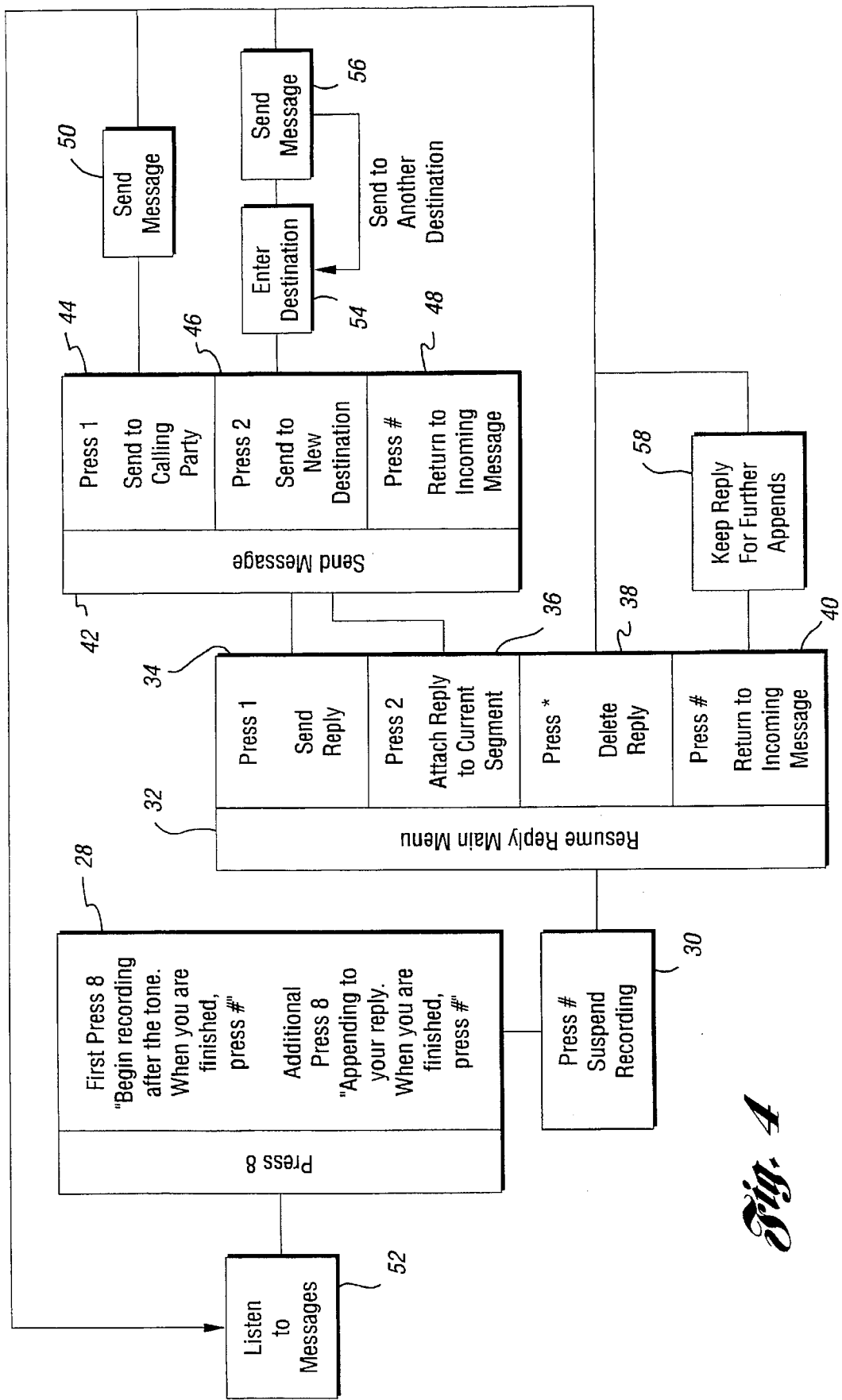
FIG. 4 is a functional block diagram illustrating the operation of the system of the present invention.

After recording has been completed, the subscriber will access a Resume Reply Main Menu generally designated as block 32 in FIG. 4. This menu provides a subscriber with four options: (1) "send reply"; (2) "attach reply to current segment"; (3) "delete reply"; and (4) "return to incoming message". In the example herein described, each of these options may be selected by depressing a corresponding DTMF key. "Send reply" may, therefore, be elected by depressing DTMF key "1" as shown in block 34. Similarly, "attach reply to current segment" may be selected by depressing DTMF key "2" as shown in block 36. Still further, "delete reply" may be selected by depressing DTMF key "*" as shown in block 38. Finally, "return to incoming message" may be selected by depressing DTMF key "#" as shown at block 40.

If the subscriber elects to "send a reply" (with or without attaching the current segment), a Send Message menu 42 is thereafter accessed. Menu 42, in turn, provides the subscriber with three additional options: (1) "send to calling party"; (2) "send to new destination"; and (3) "return to incoming message". Again, each of these options is selected by depressing a corresponding DTMF key. In this example, "send to calling party" may be selected by depressing DTMF key "1" as shown in block 44. Similarly, "send to new destination" may be selected by depressing DTMF key "2" as shown in block 46. Still further, "return to incoming message" may be selected by depressing DTMF key "#" as shown in block 48.

If the subscriber elects to send the message to the calling party, the message is sent as shown in block 50 and playback of the original message is resumed as shown in block 52. Alternatively, if the subscriber sends the response to a new destination, the subscriber is first prompted to enter the destination via DTMF prompt, voice response, etc. as shown in block 54 whereupon the message is sent as shown in block 56. Playback of the original message is thereafter again resumed.

Returning to the Resume Reply Main Menu 32, it can be seen that if the subscriber deletes her reply, playback of the original message is automatically resumed. Likewise, if the subscriber depresses the DTMF key "#" as shown in block 40, playback will also be again resumed. Block 58 "keep reply for further appends" is intended to indicate that multiple responses and responses/attached message segments sent to the same destination are concatenated to form a single response as explained in further detail below.

Figure 5:
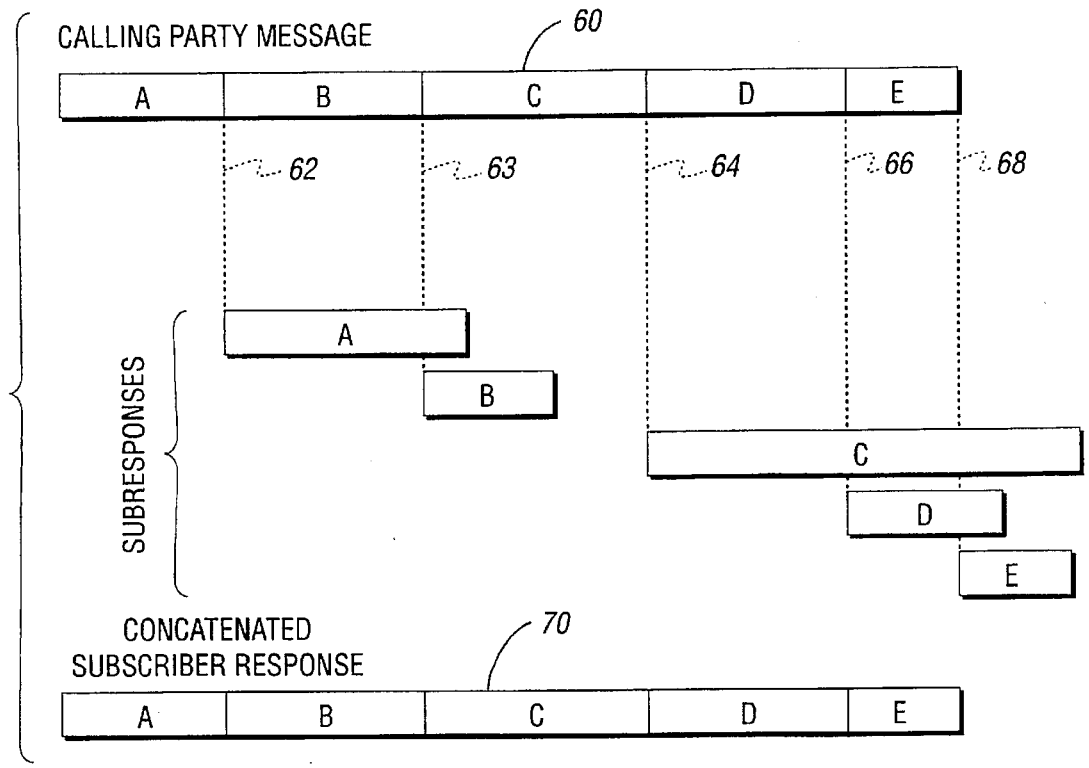
FIG. 5 is a schematic diagram illustrating the voice processing reply and resume features of the present invention.

The above described method is depicted graphically in FIG. 5 which illustrates the concatenation of multiple responses sent by a subscriber to a calling party. As shown, a calling party generates an original message 60. After playback has been activated, the subscriber, i.e. the party receiving message 60, may suspend playback at point 62 by depressing DTMF key "8" in the manner described above. Thereafter, the subscriber records a subresponse "A" which corresponds to the immediately preceding portion (message segment) "A" of message 60. The response is held for further appends (block 58) and playback is resumed in the manner described above.

The subscriber may again suspend playback at point 63 and record subresponse "B" in response to immediately preceding portion "B" of the calling party message 60. As depicted in FIG. 4, subresponses C, D and E similarly correspond to portions C, D and E of message 60 and are recorded at points 64, 66, and 68, respectively. Once all subresponses have been recorded, they are concatenated into a single concatenated response 70.

By way of further example, portion A of calling party message may comprise, for example, "Hi Tom, how are you? Sorry I missed you at the meeting yesterday. I hope all is well. By the way, how is your new son?" Portion B of message 60 may comprise "Anyway, I wanted to get back to you about your request for more information on the November conference. As you know, it is imperative that we book food service now. However, we need a fairly accurate head count before we make our final selection. If you could, please get back to me as soon as possible with an estimate so that I can wrap things up on my end." Portion C may similarly comprise "Oh, also, I need to know how many people you expect will be staying on site. We can get a block of rooms, but I need to make the necessary arrangements pretty quickly." Still further, portion D may comprise "So when you get a chance, please get back to me with the estimates. I assume you would want to chair the meeting. Let me know if there has been any changes." Finally, portion E may comprise "Thanks again, I look forward to seeing you next week. We should also get together and golf soon if you have the time."

As shown in FIG. 5, subresponses A–E may be of varying length and do not necessarily correspond to the length of the portion of the original message being responded to. In the above example, the concatenated response may appear as follows:

Thanks for the message. Alex is doing great. You should see him. He is 8 months old, weighs 20 pounds and already has a tooth. As far as I know, between 300–500 people will be attending. Probably no more than 20–30 people will need rooms on site. As far as I know, I am still chairing the meeting. I'll let you know if anything changes. Thanks again for the call. I'd love to play golf, but as you can appreciate, time is at a premium right now. Maybe in a few months. Give me a call.

Concatenated response of subresponses A–E

It is contemplated that the user may suspend playback numerous times and each time generate a subresponse to the immediately preceding portion or segment of the stored message. Each of the subresponses will be concatenated at the conclusion of message review so as to generate a single concatenated response which will be forwarded to the subscriber that sent the message, i.e. the calling party.

Figure 6:
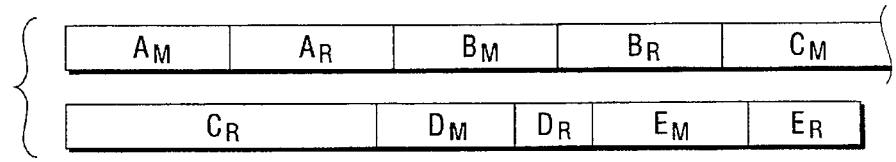
FIG. 6 is a schematic diagram illustrating the manner in which multiple responses (and message segments) directed to the same destination are concatenated in accordance with the present invention.

In keeping with another aspect of the invention, it is further contemplated that in addition to generating responses to portions of the stored message, the actual message segment itself may be attached with the subscriber's response. Thus, for example, as shown in FIG. 6, responses A–E are attached to their corresponding messages. The original messages are designated with the subscript "M" and the responses are designated with the subscript "R" for clarity purposes. In this example, wherein the subresponses and attached message segments are all sent to the calling party, the responses/message segments are concatenated so as to form a single concatenated response.

As indicated above, the subscriber need not forward responses to individual message segments to the calling party. Rather, a new destination may be selected. While it is anticipated that for clarity purposes the subscriber would likely attach the message segment to her response, such attachment is not required by the invention. In cases where multiple responses and/or multiple responses/message segments are sent to the same destination, concatenation may occur at the site of the receiving party's voicemail or, as in the example above, a buffer may be utilized to hold and append all responses (including attached message segments) until playback of the calling party's message is complete. At that time, all responses and response/message segments forwarded to the same destinations will be concatenated to form a plurality of single concatenated responses and then sent to their selected destinations.

Figure 7:
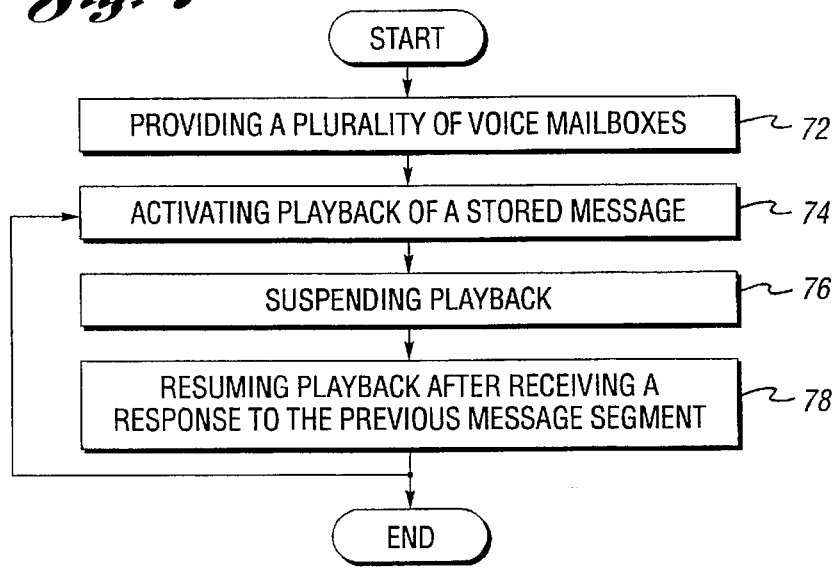
FIG. 7 is a flow diagram of the method of the present invention.

The automated method for voice processing of the present invention may be further described with reference to FIG. 7 of the drawings. As shown, the automated method includes providing 72 a plurality of voice mail boxes. Each voice mail box is assigned to a corresponding one of a plurality of subscribers in a telephone network and is operative to receive and store a plurality of voice messages sent by a corresponding one of the plurality of subscribers. A stored message may thereafter be activated 74 whereupon playback may be suspended 76 by the user after playing a first portion thereof. After a response is received 78 to the first portion of the message (the previous message segment), playback may be resumed 80 of the stored message. If desired, playback may be again suspended after playing an additional portion thereof whereupon a response to that portion may be received and playback may again be resumed. The responses to each of the portions of the messages are concatenated so as to generate a single concatenated response to be sent to a selected destination.

While the best modes for carrying out the invention has been described in detail, those familiar with the art to which this invention relates will recognize various alternative designs and embodiments for practicing the invention as defined by the following claims.

What is claimed is:

1. An automated voice processing system, comprising:
   a plurality of voice mailboxes, each voice mailbox being assigned to a corresponding one of a plurality of subscribers, and operative to receive and store a plurality of voice messages sent by a corresponding one of the plurality of subscribers; and
   a processor in electrical communication with the plurality of voice mailboxes, the processor operative to (a) playback a stored message; (b) suspend playback of the stored message after playing a first portion thereof, (c) receive a response to the first portion of the message, (d) resume playback of the message after receiving the response, and (e) forward the response to a selected destination.

2. The system of claim 1, wherein the selected destination is the voice mailbox of the one of the plurality of subscribers that sent the message.

3. The system of claim 1, wherein the processor is further operative to (a) suspend playback of a stored message after playing a second portion thereof, (b) receive a response to the second portion of the message, (c) resume playback of the message after receiving the response to the second portion of the message, and (d) forward the response to said selected destination, the response to the second portion concatenated with the response to the first portion to generate a single concatenated response.

4. The system of claim 1, wherein the processor is further operative to attach the first portion of the message with the response.

5. The system of claim 3, wherein the processor is further operative to attach the first and second portions of the stored message with their respective responses.

6. For use in a telephone network, an automated method for voice processing, comprising:
   providing a plurality of voice mailboxes, each voice mailbox being assigned to a corresponding one of a plurality of subscribers in the telephone network, and operative to receive and store a plurality of voice messages sent by a corresponding one of the plurality of subscribers;
   activating a playback of a stored message;
   suspending playback of the stored message after playing a first portion thereof;
   receiving a response to the first portion of the message;
   resuming playback of the stored message after receiving the response; and
   forwarding the response to a selected destination, wherein the steps of suspending, receiving, resuming and forwarding are performed via components of the telephone network.

7. The method of claim 1, wherein the selected destination is the voice mailbox of the one of the plurality of subscribers that sent the message.

8. The method of claim 6, further comprising:
   suspending playback of a stored message after playing a second portion thereof;
   receiving a response to the second portion of the message;
   resuming playback of the message after receiving the response to the second portion of the message; and
   forwarding the response to the first and second portions of the message to said selected destination, wherein the response to the second portion is concatenated with the response to the first portion to generate a single concatenated response.

9. The method of claim 6, further comprising attaching the first portion of the message with the response to the first portion or the message.

10. The method of claim 9, further comprising attaching the first and second portions of the message with their respective responses.

* * * * *